(12) United States Patent
Young et al.

(10) Patent No.: US 8,523,675 B2
(45) Date of Patent: *Sep. 3, 2013

(54) VIDEO GAME CONTROLLER

(75) Inventors: Andrew Brian Young, Newbridge (GB); Robert Ian Hall, Longweel Green (GB); Stephen Thomas Bright, Caldicot (GB)

(73) Assignee: Mad Catz Europe Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,906

(22) Filed: Jun. 26, 2012

(65) Prior Publication Data

US 2012/0315989 A1   Dec. 13, 2012

Related U.S. Application Data

(63) Continuation of application No. 12/123,800, filed on May 20, 2008, now Pat. No. 8,206,220.

(30) Foreign Application Priority Data

Jun. 12, 2007   (GB) .................................. 0711355.8

(51) Int. Cl.
*A63F 13/00*   (2006.01)
*A63F 13/02*   (2006.01)

(52) U.S. Cl.
USPC ......... 463/37; 463/38; 273/148 R; 273/148 B

(58) Field of Classification Search
USPC ...... 463/36–38; 273/148 R, 148 B; 345/161
See application file for complete search history.

(56) References Cited

U.S. PATENT DOCUMENTS

| | | | |
|---|---|---|---|
| 5,615,083 A | 3/1997 | Burnett | |
| 5,645,277 A | 7/1997 | Cheng | |
| 5,865,546 A | 2/1999 | Ganthier et al. | |
| 6,163,326 A | 12/2000 | Klein et al. | |
| 6,727,890 B2 | 4/2004 | Andres et al. | |
| 6,903,662 B2 | 6/2005 | Rix et al. | |
| 2005/0255915 A1* | 11/2005 | Riggs et al. | 463/37 |
| 2008/0284731 A1* | 11/2008 | Mak Pui See et al. | 345/161 |

* cited by examiner

*Primary Examiner* — Dmitry Suhol
*Assistant Examiner* — Alex F. R. P. Rada, II
(74) *Attorney, Agent, or Firm* — Durham Jones & Pinegar Intellectual Property Law Group

(57) ABSTRACT

A game controller comprising: a hand-held base unit comprising one or more base unit actuators, each configured to generate a respective actuation signal in response to user input; and a module comprising two or more module actuators, each configured to generate a respective actuation signal in response to user input. The module is mounted to the base unit and can be rotated horizontally between two or more orientations to adjust the configuration of the module actuators relative to the base unit actuator(s).

20 Claims, 6 Drawing Sheets

VIDEO GAME CONTROLLER

CROSS-REFERENCE TO RELATED APPLICATIONS

This application is a continuation of U.S. patent application Ser. No. 12/123,800 filed on May 20, 2008 and issued as U.S. Pat. No. 8,206,220 on Jun. 26, 2012, which claims priority to, and the benefit of, United Kingdom Patent Application No. 0711355.8, filed on Jun. 12, 2007. The contents of each of the foregoing are incorporated herein by this reference in their entireties.

TECHNICAL FIELD

The present invention relates to a hand-held video game controller.

BACKGROUND

Hand-held controllers are commonly used to provide user input to a video game running on a game processor such as an IBM PC™, Sony Playstation™ or Microsoft Xbox™.

Such controllers commonly include a pair of directional controllers, each operated by a respective thumb. In a conventional Xbox™ gamepad, the left thumb can either operate a directional pad (conventionally known as a D-pad) at a front-center position, or an analog stick at a rear-left position. The opposite configuration is commonly used in a conventional Playstation™ gamepad. That is, the analog stick is at the front-center position, and the D-pad is at the rear-left position.

SUMMARY

The present invention provides a video game controller comprising: a hand-held base unit comprising one or more base unit actuators, each configured to generate a respective actuation signal in response to user input; and a module comprising two or more module actuators, each configured to generate a respective actuation signal in response to user input; wherein the module is mounted to the base unit and can be rotated between two or more orientations to adjust the configuration of the module actuators relative to the base unit actuator(s), and wherein all of the module actuators are accessible to a user in each orientation of the module.

A further aspect of the invention provides a video game controller comprising: a hand-held base unit comprising one or more base unit actuators, each configured to generate a respective actuation signal in response to user input; and a module comprising two or more module actuators, each configured to generate a respective actuation signal in response to user input; wherein the module is mounted to the base unit and can be rotated horizontally between two or more orientations to adjust the configuration of the module actuators relative to the base unit actuator(s).

A further aspect of the invention provides a method of operating a video game controller, the controller comprising a hand-held base unit comprising one or more base unit actuators, each configured to generate a respective actuation signal in response to user input; and a module comprising two or more module actuators, each configured to generate a respective actuation signal in response to user input, the method comprising: mounting the module on the base unit in a first orientation; generating actuation signals with at least one of the base unit actuators and at least two of the module actuators with the module in the first orientation; rotating the module into a second orientation; and generating actuation signals with at least one of the base unit actuators and at least two of the module actuators with the module in the second orientation.

The invention enables the module actuators to be adjusted into a configuration which suits a particular user.

Typically the module or the base unit comprises two or more connectors, each of which forms a first half of a signal interface between the module and the base unit when the module is in a particular orientation. The signal interface may be a contact-less interface in which the signals are transmitted over an air interface—but more preferably the connectors comprise electrical plugs or sockets.

In the preferred embodiment described below, the multiple connectors are on the base unit. This arrangement is preferred since it enables the orientation of the module to be easily sensed by determining the presence of a signal at one or other of the connectors. However it will be appreciated that the arrangement may be reversed: that is with the multiple connectors on the module instead of the base unit.

In the preferred embodiment described below the base unit actuators are carried by the base unit in a fixed position. However, the invention also extends to cover a video game controller in which the base unit actuators are not fixed to the base unit. For instance the base unit actuators may be carried by a second module which is mounted to the base unit and can be rotated between two or more orientations to adjust the configuration of the base unit actuators relative to the base unit.

BRIEF DESCRIPTION OF THE DRAWINGS

Embodiments of the invention will now be described with reference to the accompanying drawings, in which.

DETAILED DESCRIPTION

Figure 1:
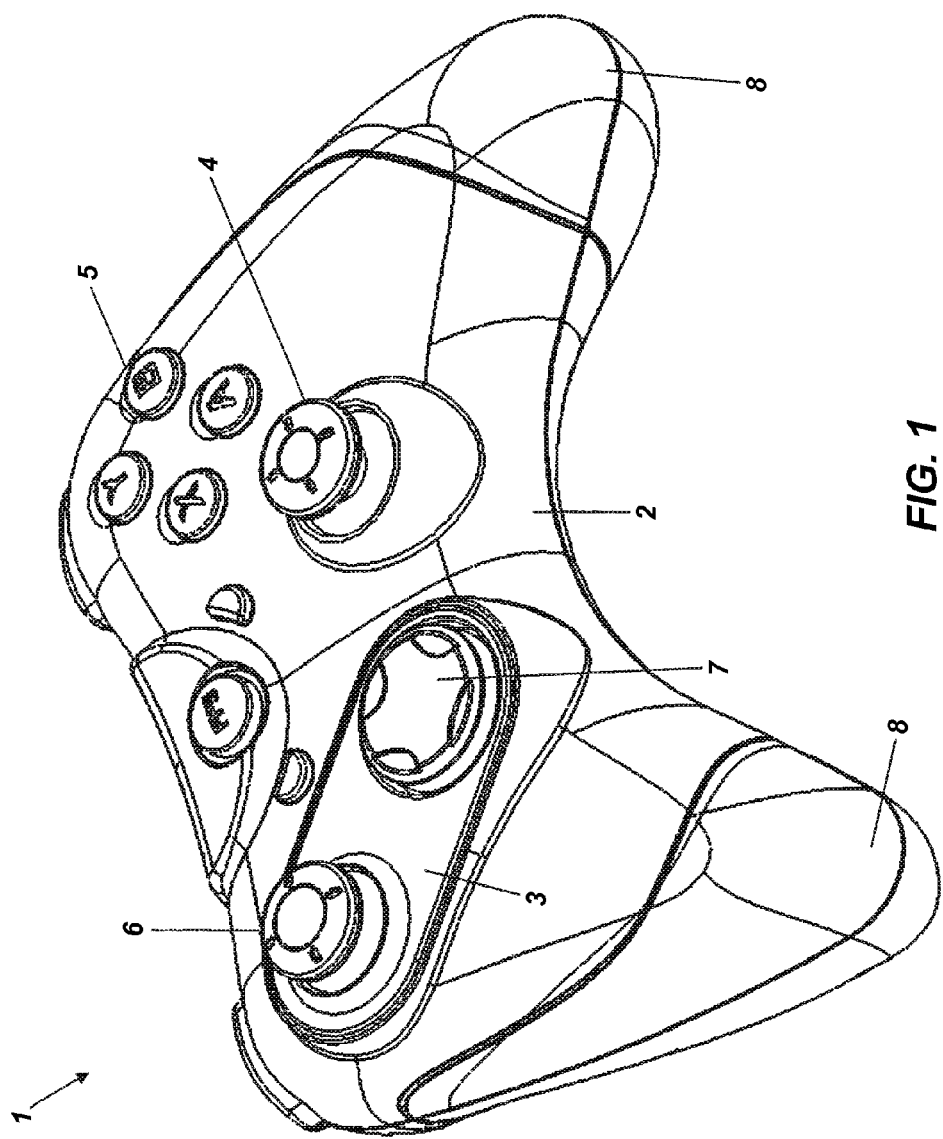
FIG. 1 is a perspective view of a gamepad with the module in an Xbox™ configuration.

A gamepad 1 shown in FIG. 1 comprises a base unit 2 and a module 3 mounted to the base unit. The base unit carries an analog stick 4 and a set of four action buttons 5. The module 3 carries an analog stick 6 and a directional pad 7 (conventionally known as a D-pad).

The gamepad 1 provides user input to a video game running on a game processor (not shown). The game processor may comprise a dedicated video game console such as a Sony Playstation™ or Microsoft Xbox™, or a more generic computing device such as an IBM PC™ or laptop.

The analog sticks 4, 6 and D-pad 7 act as direction controllers: that is, actuation signals generated in response to user input by the analog sticks 4, 6 and D-pad 7 are generally used to control direction in the video game, such as the direction of movement of a person in a first-person shooting game. The actuation signals generated in response to user input by the action buttons 5 generally prompt an action in the video game, such as the firing of a shot in a first-person shooting game.

The base unit 2 has a pair of hand grips 8 extending from its front, and a wire (also not shown) connecting the gamepad to the game processor extends from the rear of the base unit.

The analog stick 6 and D-pad 7 are arranged in the orientation shown in FIG. 1; that is, with the D-pad 7 at the front-center position, and the analog stick 6 at the rear-left position. In this orientation the D-pad 7 is symmetrically opposite the analog stick 4, enabling the D-pad 7 to be operated by the left thumb and the analog stick 4 to be operated by the right thumb. This configuration is commonly used in a conventional Xbox™ gamepad.

Figure 2:
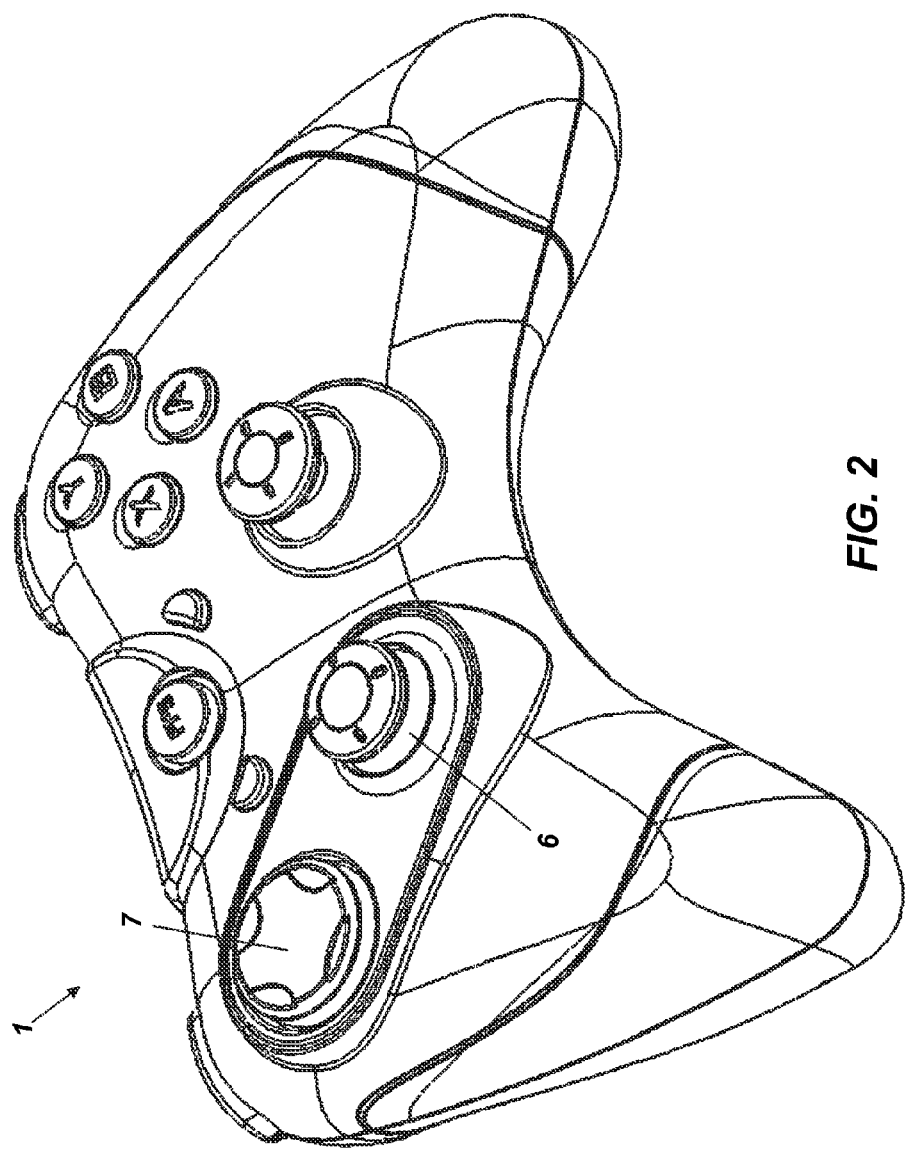
FIG. 2 is a perspective view of the gamepad with the module in a Playstation™ configuration.

The module 3 can be rotated between the orientation shown in FIG. 1 to the orientation shown in FIG. 2, in which the analog stick 6 is at the front-center position. This configuration is commonly used in a conventional Playstation™ gamepad. Note that both the analog stick 6 and D-pad 7 are accessible to a user, whether the module is in the FIG. 1 orientation or the FIG. 2 orientation. The rotation of the module is in the same plane as the base unit—i.e. horizontal if the base unit is being held horizontally.

Figure 3:
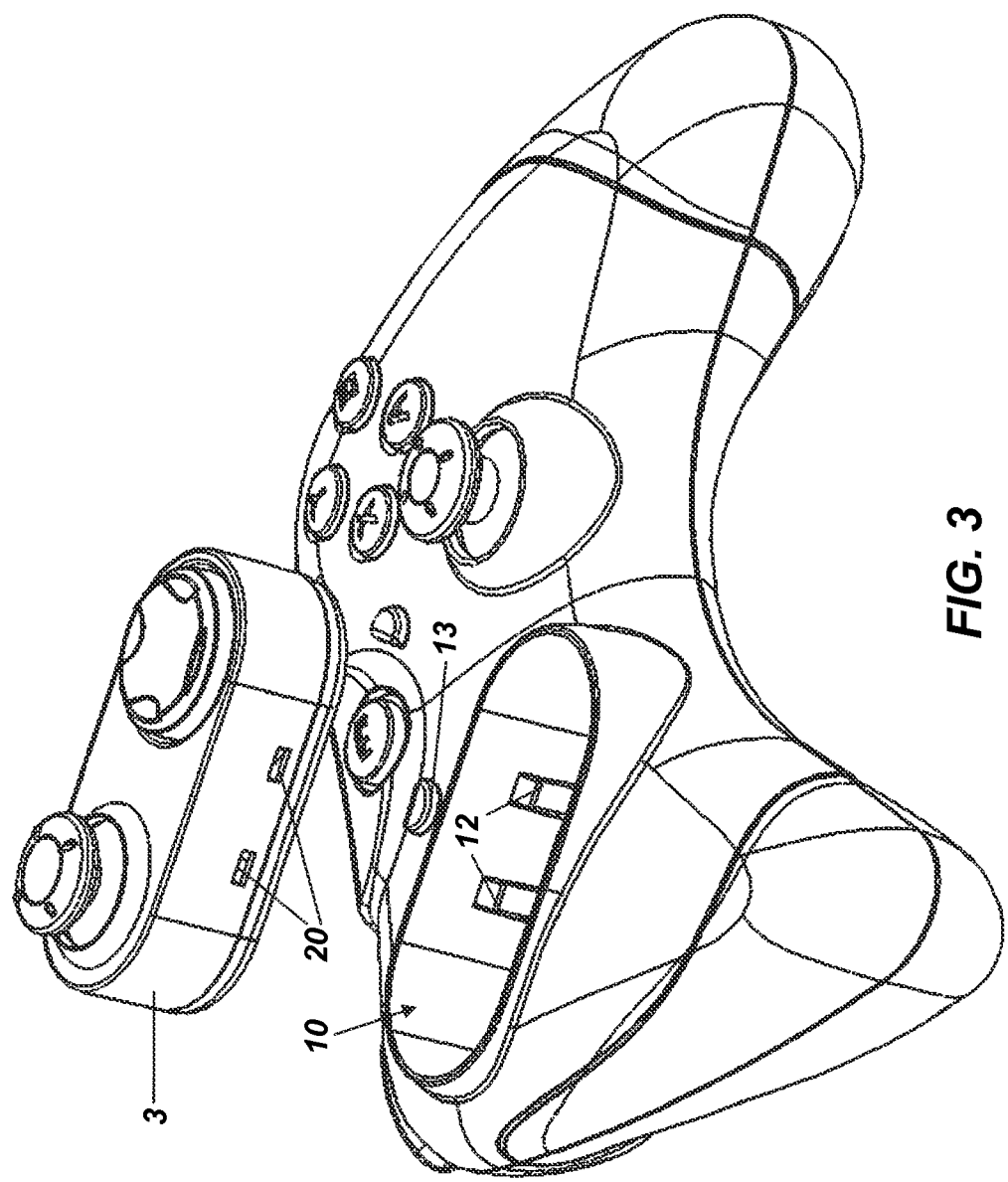
FIG. 3 shows the module being removed from the base unit.
Figure 5:
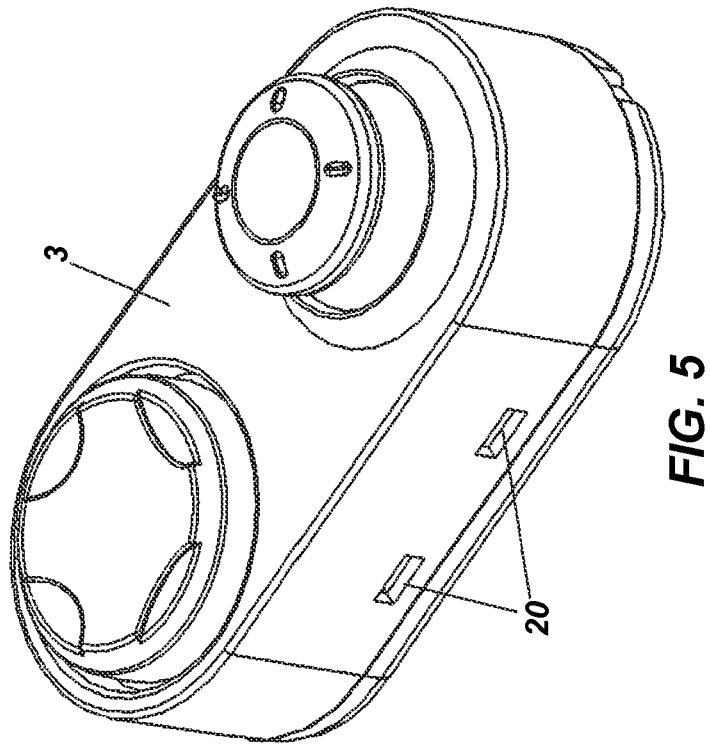
FIG. 5 is a perspective view of the top of the module.
Figure 6:
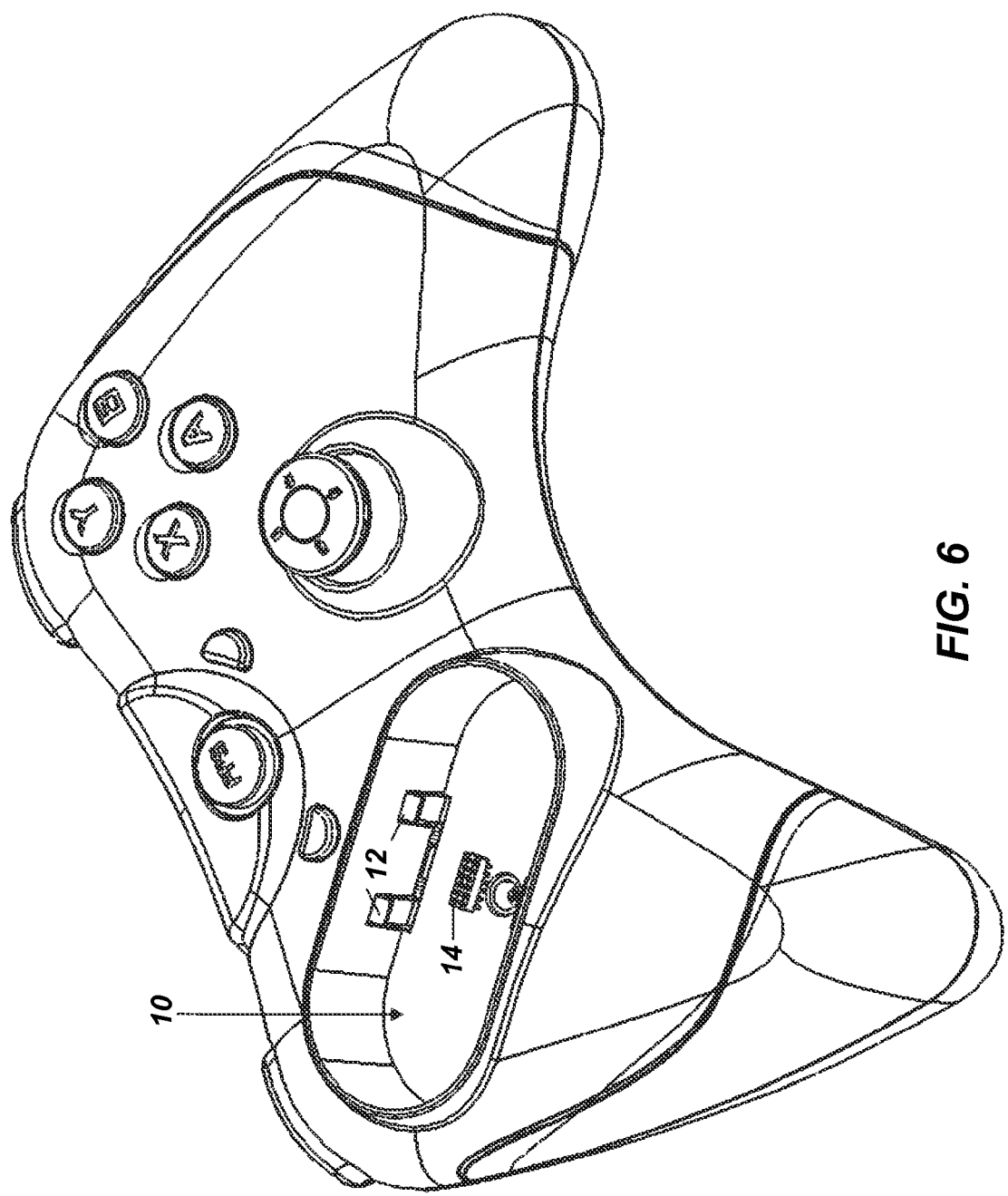
FIG. 6 is a perspective view of the base unit with the module removed.
Figure 7:
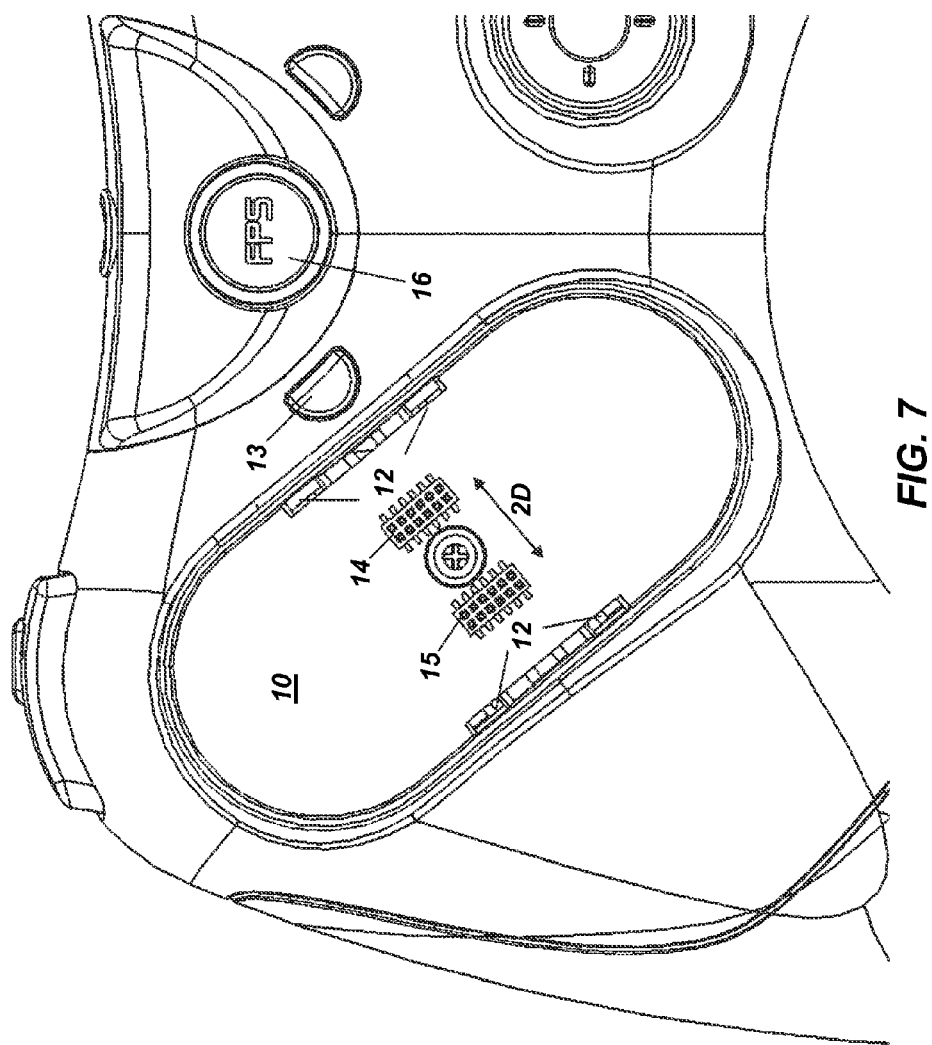
FIG. 7 is an enlarged plan view of the recess in the base unit.

The module 3 is housed in a recess 10 in the upper face of the base unit, shown in FIGS. 3, 6 and 7. Two pairs of spring loaded latches 12 are provided at the base of the recess. The latches 12 engage with recesses 20 on each side of the module 3, shown in FIGS. 4 and 5. A button 13 can be pressed to disengage the latches 12 and eject the module from the recess as shown in FIG. 3.

Figure 4:
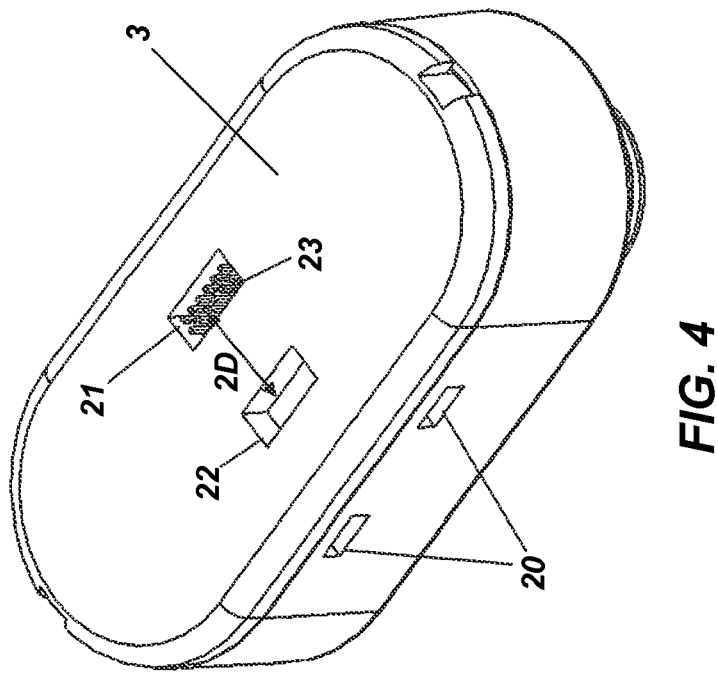
FIG. 4 is a perspective view of the underside of the module.

The base of the module, shown in FIG. 4, has a pair of recesses 21, 22 which are offset from the center of the module by an equal distance D. Therefore the distance between the centers of the recesses 21, 22 is 2D as illustrated in FIG. 4. A set of eight electrical pins 23 projects from the base of the recess 21. This set of pins 23 carries actuation signals from both the analog stick 6 and the D-pad 7. The base of the recess 10 in the base unit has two plugs 14, 15 shown in FIG. 7, each carrying a set of eight electrical sockets, which are each offset from the center of the recess by the distance D. The plugs 14, 15 slide into the module recesses 21, 22 when the module is fitted to the base unit.

Each plug 14, 15 forms a first half of a signal interface which couples the module to the base unit when the module is in a particular orientation. That is, when the module 3 is in the orientation of FIG. 1 the pins 23 are inserted into the sockets carried by the plug 14, and when the module 3 is in the orientation of FIG. 2 the pins 23 are inserted into the sockets carried by the other plug 15.

The plugs 14, 15 each have respective output lines (not shown) which lead to a processor (not shown) in the base unit. The processor senses the orientation of the module by determining the presence of a signal on one or other of the output lines. The processor also acts as an interface between the video game and the various actuators on the game pad. An indication light 16 is illuminated a first colour when the module 3 is in the configuration of FIG. 1, and a second colour when the module 3 is in the configuration of FIG. 2.

Although the invention has been described above with reference to one or more preferred embodiments, it will be appreciated that various changes or modifications may be made without departing from the scope of the invention as defined in the appended claims.

What is claimed is:

1. A video game controller, comprising:
    a hand-held base unit, the hand-held base unit including:
        a body defining an opening; and
        at least two first electrical connectors cooperating with the opening; and
    a removable module, the removable module including:
        two or more module actuators each configured to each generate an electrical actuation signal in response to user input;
        two or more second electrical connectors; and
        a module body carrying each of the two or more module actuators and the two or more second electrical connectors, wherein the module body is sized and configured to be at least partially received within the opening of the hand-held base unit in at least two different orientations, and wherein in a first orientation each of the two or more second electrical connectors connects to a respective one of the at least two first electrical connectors, and in a second orientation each of the two or more second electrical connectors connects to a different one of the at least two first electrical connectors.

2. The video game controller of claim 1, wherein each of the second electrical connectors is associated with one of the two or more module actuators.

3. The video game controller of claim 1, wherein each of the second electrical connectors is associated with a different one of the two or more module actuators.

4. The video game controller of claim 1, wherein the two or more second electrical connectors are disposed on an exterior surface of the module body.

5. The video game controller of claim 1, wherein the two or more second electrical connectors are disposed within one or more recesses in the module body.

6. The video game controller of claim 1, wherein the at least two first electrical connectors are positioned within the opening.

7. The video game controller of claim 1, wherein the opening and the module body each have an oblong shape.

8. The video game controller of claim 1, wherein the opening is defined by a recess in the body.

9. The video game controller of claim 1, wherein the two or more module actuators include at least:
    a directional pad; and
    an analog controller.

10. The video game controller of claim 1, wherein the removable module is configured to be rotated to change between the first and second orientations.

11. The video game controller of claim 10, wherein the rotation is horizontal relative to the hand-held base unit when the hand-held base unit is positioned horizontally.

12. A method of operating a video game controller, comprising:
    accessing a hand-held video game controller with a removable module carrying a plurality of module actuators coupled in a first orientation relative to a base unit of the video game controller, wherein in the first orientation each of two first electrical connectors of the module is in electrical communication with a corresponding one of two second electrical connectors of a receiving portion of the base unit;
    removing the module from the receiving portion of the base unit;
    rotating the module from the first orientation to a different, second orientation relative to the base unit to change an orientation of the plurality of module actuators relative to the base unit and the receiving portion of the base unit; and recoupling the module to the same receiving portion of the base unit in the second orientation, including reestablishing electrical communication between the plurality of module actuators and the base unit such that each of the two first electrical connectors of the module is in electrical communication with a different one of the two second electrical connectors of the receiving portion of the base unit.

13. The method of claim 12, wherein removing the module from the receiving portion includes removing the module and each of the plurality of module actuators from an opening defined by the base unit.

14. The method of claim 12, wherein recoupling the module to the same receiving portion of the base unit includes inserting the module at least partially within an opening defined by the base unit.

15. The method of claim 12, wherein rotating the module includes changing an orientation of two directional module actuators relative to the base unit.

16. The method of claim 12, wherein two directional module actuators are in a first position when the hand-held video game controller is accessed, and wherein the at least two directional module actuators are in a different, second position upon recoupling the module to the same receiving portion.

17. The method of claim 12, wherein rotating and recoupling the module includes swapping places of two module actuators relative to the same receiving portion.

18. A video game controller, comprising:

a hand-held base unit; and a module comprising two or more module actuators and two or more electrical connectors on a single body, each module actuator being configured to generate a respective actuation signal in response to user input and convey the actuation signal to at least one respective electrical connector, wherein the module is removably mounted at least partially within an opening defined by the hand-held base unit, the module being configured to be rotated between two or more orientations, the module remaining at least partially within the opening in each of the two or more orientations, and the two or more orientations changing a configuration of the two or more module actuators and the two or more electrical connectors relative to the hand-held base unit.

19. The video game controller of claim 18, wherein the opening is associated with a recess in the hand-held base unit, the recess defining a plurality of discrete orientations for the module relative to the hand-held base unit.

20. The video game controller of claim 18, wherein the hand-held base unit includes a plurality of electrical contacts configured to engage the electrical connectors of the module, the electrical contacts being configured to engage the electrical connectors in each of the two or more orientations.

* * * * *